United States Patent
Inoue et al.

(10) Patent No.: US 7,043,347 B2
(45) Date of Patent: May 9, 2006

(54) HYDRAULIC CLUTCH CONTROL OF VEHICLE POWER TRAIN

(75) Inventors: Naoya Inoue, Shizuoka (JP); Tateki Jozaki, Shizuoka (JP); Tatsuo Ochiai, Shizuoka (JP)

(73) Assignee: Jatco LTD, Fuji (JP)

( * ) Notice: Subject to any disclaimer, the term of this patent is extended or adjusted under 35 U.S.C. 154(b) by 202 days.

(21) Appl. No.: 10/648,826

(22) Filed: Aug. 27, 2003

(65) Prior Publication Data

US 2004/0111205 A1 Jun. 10, 2004

(30) Foreign Application Priority Data

Aug. 28, 2002 (JP) .............................. 2002-248702

(51) Int. Cl.
*G06F 10/00* (2006.01)
*F16H 31/00* (2006.01)

(52) U.S. Cl. ........................ 701/67; 701/66; 701/68; 475/116; 475/120; 477/117; 477/156

(58) Field of Classification Search ................ 701/62, 701/66, 67, 68, 51, 58; 477/171–175, 181, 477/115–117, 143, 150, 156, 166, 168; 192/3.1, 192/3.58, 85 R, 109 F, 3.51, 3.57, 87.13; 475/60–70, 116–120, 127

See application file for complete search history.

(56) References Cited

U.S. PATENT DOCUMENTS

| 4,836,057 A | * | 6/1989 | Asayama et al. | ........... 477/120 |
|---|---|---|---|---|
| 5,046,174 A | * | 9/1991 | Lentz et al. | ................... 701/60 |
| 5,119,695 A | * | 6/1992 | Milunas et al. | ............... 477/98 |
| 5,128,868 A | * | 7/1992 | Imai et al. | ..................... 701/51 |
| 5,231,898 A | * | 8/1993 | Okura | .......................... 477/95 |
| 5,737,979 A | * | 4/1998 | McKenzie et al. | ......... 74/731.1 |
| 6,088,645 A | * | 7/2000 | Kawasaki et al. | ............. 701/67 |
| 6,328,674 B1 | * | 12/2001 | Matsue et al. | ............. 477/155 |
| 6,491,604 B1 | * | 12/2002 | Katou et al. | ................ 477/154 |
| 6,872,166 B1 | * | 3/2005 | Takagi et al. | ................ 477/117 |
| 2004/0029672 A1 | * | 2/2004 | Tsunekawa et al. | ........... 475/65 |

FOREIGN PATENT DOCUMENTS

| JP | 05-332441 A | 12/1993 |
|---|---|---|
| JP | 08-326897 A | 12/1996 |
| JP | 10-103473 A | 4/1998 |
| JP | 2001-041317 A | 2/2001 |
| JP | 2001-235020 A | 8/2001 |
| JP | 2001-336625 A | 12/2001 |

* cited by examiner

*Primary Examiner*—Jacques H. Louis-Jacques
(74) *Attorney, Agent, or Firm*—Foley & Lardner LLP (57) ABSTRACT

A hydraulic clutch transmits driving torque in a power train of a vehicle. An oil pressure supply unit supplies oil pressure for engagement to the clutch and a controller controls the unit. The controller causes the unit, prior to engagement of the clutch, to precharge the interior of the clutch with hydraulic fluid. The controller counts an elapsed time since the last release of the clutch and shortens the precharge period as the elapsed time decreases, thereby optimizing the precharge state of the clutch.

10 Claims, 8 Drawing Sheets

HYDRAULIC CLUTCH CONTROL OF VEHICLE POWER TRAIN

FIELD OF THE INVENTION

This invention relates to the control of a hydraulic clutch applied to a power train of a vehicle comprising an automatic transmission.

BACKGROUND OF THE INVENTION

In vehicles comprising an automatic transmission, when a shift lever of the automatic transmission is switched from a neutral (N) range to a drive (D) range in order for the vehicle to advance, for example, the hydraulic clutch is engaged in order to transmit the rotation torque of the engine to the drive wheel. Since an oil pressure supply path for supplying oil pressure to the hydraulic clutch is at zero when the hydraulic clutch is released, a time lag occurs between the supply of oil pressure to the oil pressure supply path and the engagement of the hydraulic clutch. If the speed of oil pressure supply is increased in order to reduce this time lag, shock is generated due to the rapid engagement of the hydraulic clutch.

JP2001-336625A, published by the Japan Patent Office in 2001, discloses a method of temporarily raising the oil pressure inside the oil pressure supply path which is supplied to the hydraulic clutch at the stage of shift lever operation, or in other words performing so-called precharging. When precharging is performed, hydraulic fluid is filled into the oil pressure supply path prior to the engagement action of the hydraulic clutch, and since the time lag in the engagement operation of the hydraulic clutch is eliminated, the subsequent engagement action of the hydraulic clutch can be performed smoothly and swiftly.

SUMMARY OF THE INVENTION

In this conventional technology, if a driver of the vehicle switches the shift lever between the drive (D) range and the neutral (N) range frequently prior to advance of the vehicle, precharging is performed every time the shift lever is switched. As a result, the oil pressure inside the oil pressure supply path rises excessively such that when D range is selected and the vehicle actually begins to advance, engagement shock in the hydraulic clutch increases.

It is therefore an object of this invention to maintain the precharge pressure of a hydraulic clutch which performs precharging at a preferred level even when a shift lever is operated repeatedly.

In order to achieve the above object, this invention provides a control device for a hydraulic clutch which is provided in a power train of a vehicle to transmit a drive torque. The device comprises an oil pressure supply unit which supplies oil pressure to engage the clutch, and a programmable controller programmed to count an elapsed time following a release of the clutch, and cause the oil pressure supply unit, when the clutch is engaged from a state of release, to precharge the interior of the clutch in accordance with the counted time to fill the interior of the clutch with hydraulic fluid prior to engage the clutch.

This invention also provides a control method of a hydraulic clutch which is provided in a power train of a vehicle to transmit a drive torque and is engaged by oil pressure. The method comprises counting an elapsed time following a release of the clutch, and precharging the interior of the clutch in accordance with the counted time to fill the interior of the clutch with hydraulic fluid prior to engage the clutch.

The details as well as other features and advantages of this invention are set forth in the remainder of the specification and are shown in the accompanying drawings.

DESCRIPTION OF THE PREFERRED EMBODIMENTS

Figure 1:
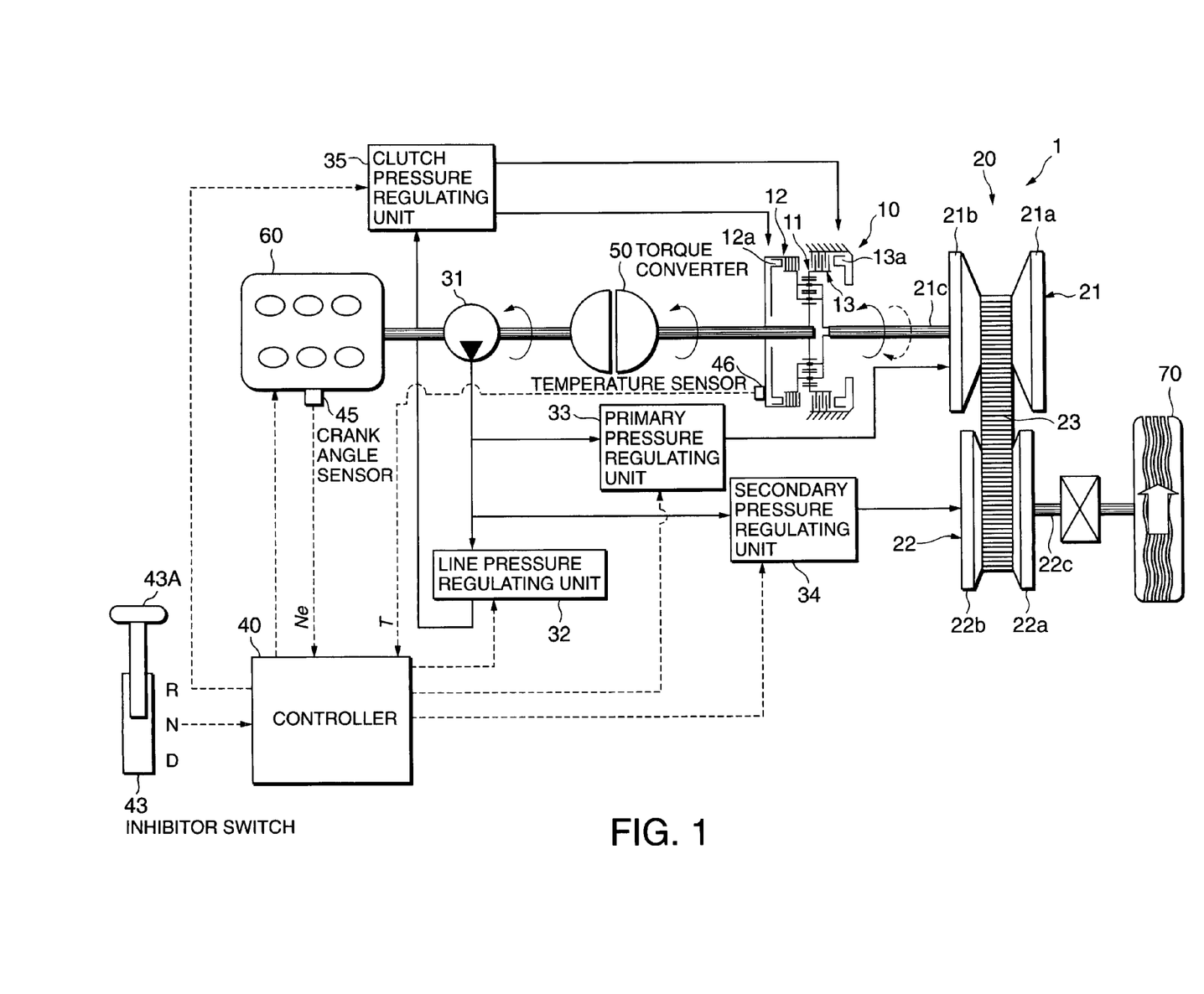
FIG. 1 is a schematic diagram of a vehicle power train to which this invention is applied.

Referring to FIG. 1 of the drawings, the rotation torque of an internal combustion engine 60 of a vehicle is transmitted to a drive wheel 70 through a power train 1.

The power train 1 comprises a torque converter 50, a forward/reverse change-over mechanism 10, and a belt continuously variable transmission (CVT) 20.

The torque converter 50 is a well-known mechanism for transmitting rotation smoothly using oil filled into its interior as a medium.

The belt CVT 20 comprises a primary pulley 21, a secondary pulley 22, and a V-belt 23 which is wrapped around the pulleys 21 and 22.

The rotation torque of the engine 60 is input to the primary pulley 21 via the torque converter 50, the forward/reverse change-over mechanism 10, and an input shaft 21c. The primary pulley 21 comprises a fixed conical plate 21a which rotates integrally with the input shaft 21c and a movable conical plate 21b which is disposed opposite the fixed conical plate 21a. A V-shaped pulley groove is formed between the fixed conical plate 21a and movable conical plate 21b. The movable conical plate 21b displaces along the input shaft 21c in accordance with a primary pressure supplied from a primary pressure regulating unit 33, thereby altering the width of the pulley groove.

The secondary pulley 22 comprises a fixed conical plate 22a which rotates integrally with an output shaft 22c and a movable conical plate 22b which is disposed opposite the fixed conical plate 22a. A pulley groove is formed between the fixed conical plate 22a and movable conical plate 22b. The movable conical plate 22b displaces along the output shaft 22c in accordance with a secondary pressure supplied from a secondary pressure regulating unit 34, thereby altering the width of the pulley groove.

The belt 23 is engaged with the pulley groove of the primary pulley 21 and the pulley groove of the secondary pulley 22 respectively, and transmits the rotation of the primary pulley 21 to the secondary pulley 22, or vice versa. By altering the width of the pulley grooves using the primary pressure and secondary pressure, the speed ratio of the belt CVT 20, or in other words the ratio of the rotation speed of the input shaft 21c to the rotation speed of the output shaft 22c, varies continuously. The pressure-receiving surface area of the secondary pulley 22 and the pressure-receiving surface area of the primary pulley 21 are set to be substantially equal. The primary pressure regulating unit 33 and secondary pressure regulating unit 34 are both constituted by well-known pressure regulating mechanisms such as solenoids, servo links comprising mechanical feedback mechanisms, and step motors, and the primary pressure and secondary pressure are regulated in accordance with a signal from a controller 40.

The forward/reverse change-over mechanism 10 is provided to switch the rotation direction of the torque which is transmitted between the engine 60 and primary pulley 21. The forward/reverse change-over mechanism 10 comprises a planetary gear set 11, a forward clutch 12, and a reverse clutch 13. The planetary gear set 11 is a well-known mechanism constituted by a sun gear, planet gears consisting of double pinions, a carrier, and a ring gear. The sun gear is connected to an output shaft of the torque converter 50, and the carrier is connected to the input shaft 21c of the CVT 20.

The forward clutch 12 is engaged and released in accordance with a motion of a hydraulic forward clutch piston 12a. In a state of engagement, the sun gear and carrier are integrated and the output rotation of the torque converter 50 is transmitted to the input shaft 21c as is.

The reverse clutch 13 is engaged and released in accordance with a motion of a hydraulic reverse clutch piston 13a. In a state of engagement, by inhibiting the rotation of the ring gear, the carrier rotates in the opposite direction to the sun gear. As a result, the output rotation of the torque converter 50 is transmitted to the input shaft 21c in reverse.

The supply of oil pressure to the forward clutch piston 12a and reverse clutch piston 13a is performed by a clutch pressure regulating unit 35 which operates in response to a signal from the controller 40. The forward clutch piston 12a engages the forward clutch 12 upon reception of the supply of oil pressure from the clutch pressure regulating unit 35, and releases the forward clutch 12 when the oil pressure is released to a drain. Similarly, the reverse clutch piston 13a engages the reverse clutch 13 upon reception of the supply of oil pressure from the clutch pressure regulating unit 35, and releases the reverse clutch 13 when the oil pressure is released to a drain.

The clutch pressure regulating unit 35 supplies oil pressure exclusively to the clutch from among the forward clutch piston 12a and reverse clutch piston 13a in response to the signal from the controller 40. The oil pressure magnitude is also controlled by this signal. Exclusive supply means that when oil pressure is supplied to one of the clutches, the oil pressure of the other clutch is invariably released to a drain. The clutch pressure regulating unit 35 also releases oil pressure exerted on the forward clutch piston 12a and reverse clutch piston 13a to a drain in response to a signal from the controller 40.

The primary pressure regulating unit 33, secondary pressure regulating unit 34, and clutch pressure regulating unit 35 each reduce a line pressure supplied by a hydraulic pump 31 which is driven by the engine 60 and supply a reduced pressure to the corresponding apparatus in response to a signal form the controller 40. When the engine 60 is running, the line pressure is held at a predetermined pressure by a line pressure regulating unit 32 which operates in response to a signal from the controller 40.

The controller 40 is constituted by a microcomputer comprising a central processing unit (CPU), read-only memory (ROM), random access memory (RAM), and an input/output interface (I/O interface). The controller may also be constituted by a plurality of microcomputers.

To perform the control described above, a range signal, an engine rotation speed signal, and a temperature signal are each input into the controller 40 from an inhibitor switch 43 attached to a shift lever 43A which is operated by the driver of the vehicle, a crank angle sensor 45 which detects the rotation speed Ne of the engine 60, and a temperature sensor 46 which detects the oil temperature T of the forward/reverse change-over mechanism 10 respectively.

The shift lever 43A selectively specifies the drive (D) range, neutral (N) range, and a reverse (R) range in response to an operation by the driver. The controller 40 controls the clutch pressure regulating unit 35 in accordance with the selected range of the shift lever 43A, which is detected by the inhibitor switch 43, such that in the D-range the forward clutch 12 is engaged and the reverse clutch 13 is released, in the R-range the forward clutch 12 is released and the reverse clutch 13 is engaged, and in the N-range the forward clutch 12 and reverse clutch 13 are both released.

The controller 40 also controls the output torque and rotation speed of the engine 60 by adjusting the fuel consumption amount, throttle opening, and ignition timing of the engine 60 by means of signal output to the engine 60. Here, an input torque Tin to the torque converter 50 and an output torque Tout from the torque converter 50 are expressed in relation to the engine rotation speed Ne, a coefficient of capacity t of the torque converter, and a torque ratio t of the torque converter by the following equations (1) and (2).

$$\text{Tin} = \tau \text{Ne}^2 \qquad (1)$$

$$\text{Tout} = \tau \text{Ne}^2 t \qquad (2)$$

As is understood from the equations (1) and (2), the transmitted torque of the torque converter 50 is determined by the engine rotation speed Ne.

When the forward clutch 12 or reverse clutch 13 of the forward/reverse change-over mechanism 10 are engaged, the aforementioned precharging is performed in response to an operation of the shift lever 43A in order to achieve a smooth and swift action. The precharge pressure and precharge time period are controlled such that even if the shift lever 43A is switched between the D-range and N-range frequently during a short time period, the precharge pressure does not rise excessively.

Figure 2:
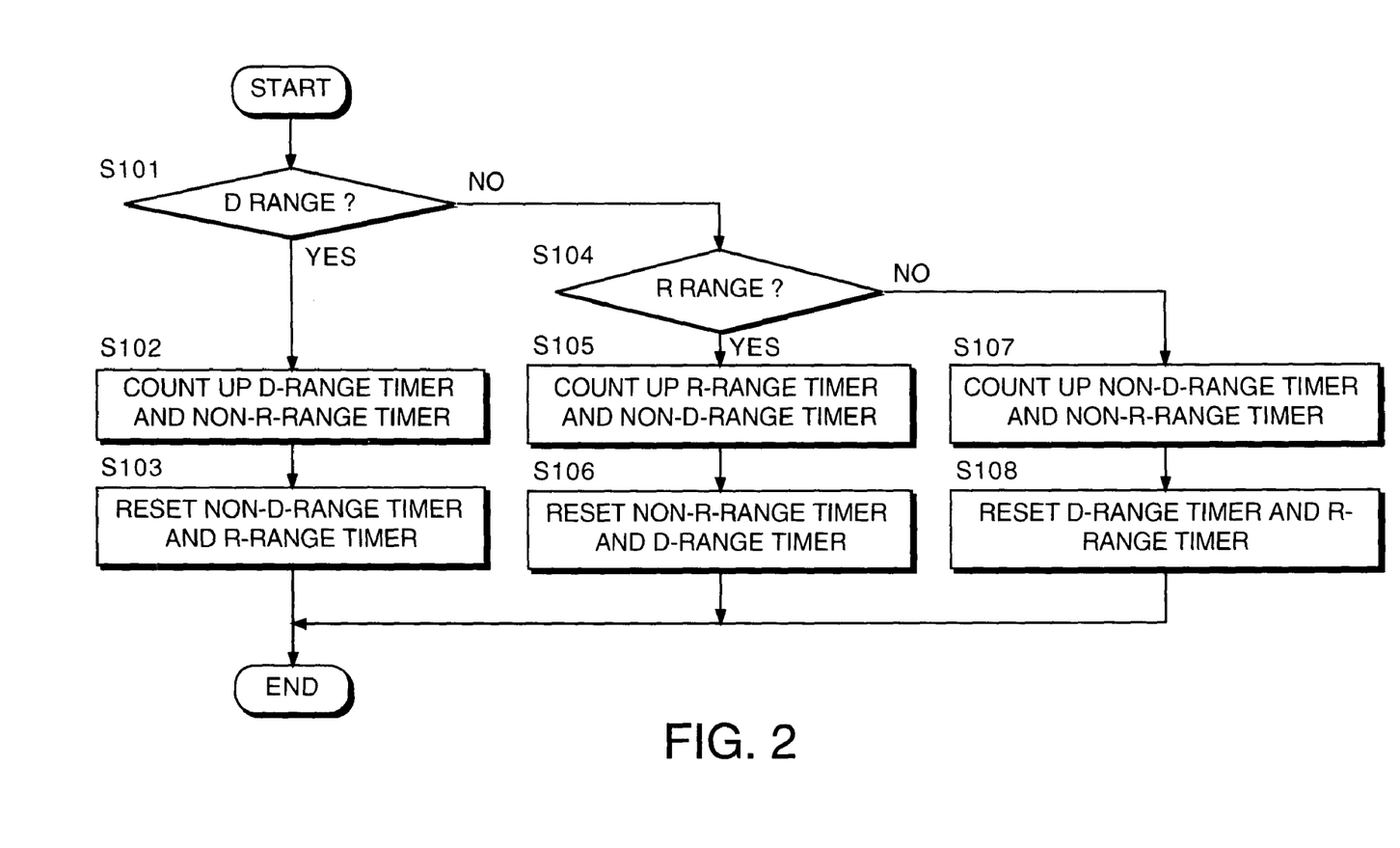
FIG. 2 is a flowchart illustrating a timer counting routine executed by a controller according to this invention.
Figure 3:
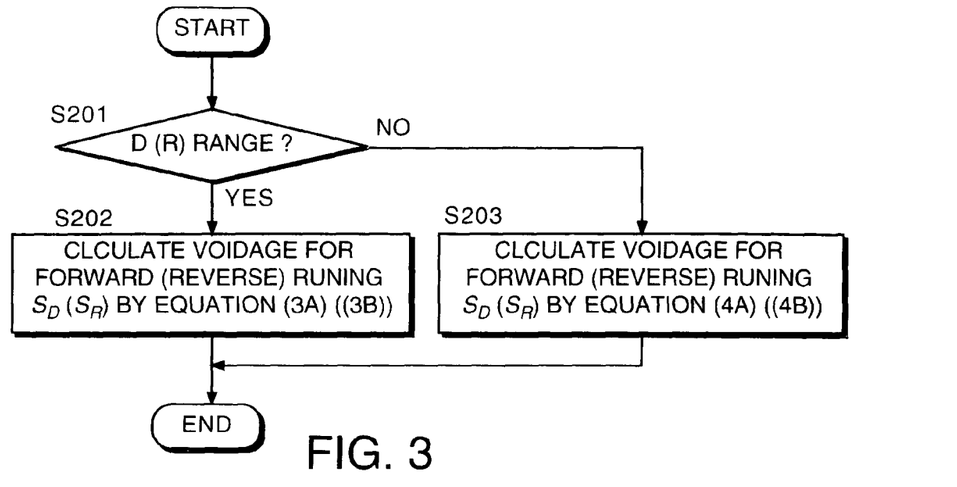
FIG. 3 is a flowchart illustrating a voidage calculation routine executed by the controller.
Figure 4:
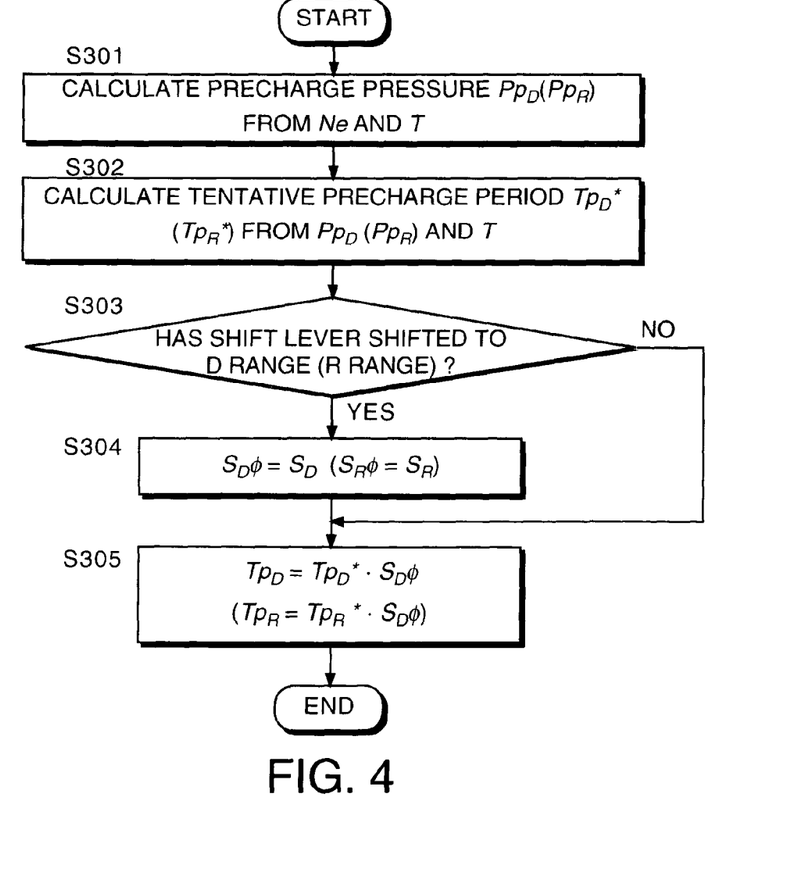
FIG. 4 is a flowchart illustrating a precharge period calculation routine executed by the controller.

To achieve this, the controller 40 executes the control routines shown in FIGS. 2–4. These routines are executed independently from each other at intervals of ten milliseconds while the engine 60 is running.

First, referring to FIG. 2, a timer counting routine will be described.

The controller 40 comprises in its interior a D-range timer, a non-D-range timer, an R-range timer, and a non-R-range timer. These timers do not exist physically, but are timer functions executed by software which uses the clock function of the microcomputer.

In a step S101, the controller 40 determines whether or not the shift lever 43A has selected the D-range on the basis of an input signal from the inhibitor switch 43.

If the shift lever 43A has selected the D-range, the controller 40 counts up the D-range timer and the non-R range-timer in a step S102. In a next step S103, the non-D-range timer and R-range timer are reset.

If, in the step S101, the shift lever 43A has not selected the D-range, the controller 40 determines in a step S104 whether or not the shift lever 43A has selected the R-range.

If the shift lever 43A has selected the R-range, the controller 40 counts up the R-range timer and non-D-range timer in a step S105. In a next step S106, the non-R-range timer and D-range timer are reset.

If, in the step S104, the shift lever 43A has not selected the R-range, the controller 40 counts up the non-D-range timer and non-R-range timer in a step S107. In a next step S108, the D-range timer and R-range timer are reset.

The controller 40 terminates the routine following the processing in any of the steps S103, S106, and S108.

By executing the routine described above, the four types of timers used to count continuous time periods of the D-range, non-D-range, R-range, and non-R-range respectively are counted up and reset.

Next, referring to FIG. 3, a voidage calculation routine will be described.

When the forward clutch 12 is engaged, the interior of a clutch piston chamber of the forward clutch 12 is filled with hydraulic fluid, and when the forward clutch 12 is released, the chamber is empty. When the reverse clutch 13 is engaged, the interior of a clutch piston chamber of the reverse clutch 13 is filled with hydraulic fluid, and when the reverse clutch 13 is released, the chamber is empty.

The voidage $S_D$ ($S_R$) of these piston chambers is expressed according to the following equation.

$S_D S_R$=(capacity of clutch piston chamber−volume of hydraulic fluid inside clutch piston chamber)/capacity of clutch piston chamber Hence when the clutch piston chamber is filled with hydraulic fluid, the voidage is zero percent, and when the clutch piston chamber is empty, the voidage is a hundred percent. During an engagement operation of both the forward clutch 12 and reverse clutch 13, the voidage decreases toward zero percent as time elapses, and during a release operation of the forward clutch 12, the voidage increases from zero percent as time elapses.

The voidage $S_D$ when the forward clutch 12 is engaged is calculated on the basis of a value of the D-range timer according to the following equation (3A). Similarly, the voidage $S_R$ when the reverse clutch 13 is engaged is calculated on the basis of a value of the R-range timer according to the following equation (3B).

$$S_D = S_{D(n-1)} - \text{D-RANGE TIMER VALUE} \cdot \text{filling ratio} \quad (3A)$$

$$S_R = S_{R(n-1)} - \text{R-RANGE TIMER VALUE} \cdot \text{filling ratio} \quad (3B)$$

where, $S_{D(n-1)}$, $S_{R(n-1)}$=voidage during the previous execution of the routine.

The minimum value of the voidage $S_D$ and the voidage $S_R$ is zero percent.

Meanwhile, the voidage $S_D$ when the forward clutch 12 is released is calculated on the basis of a value of the non-D-range timer according to the following equation (4A). Similarly, the voidage $S_R$ when the reverse clutch 13 is released is calculated on the basis of a value of the non-R-range timer according to the following equation (4B).

$$S_D = S_{D(n-1)} + \text{NON-D-RANGE TIMER VALUE} \cdot \text{exhaust ratio} \quad (4A)$$

$$S_R = S_{R(n-1)} + \text{NON-R-RANGE TIMER VALUE} \cdot \text{exhaust ratio} \quad (4B)$$

Figure 5:
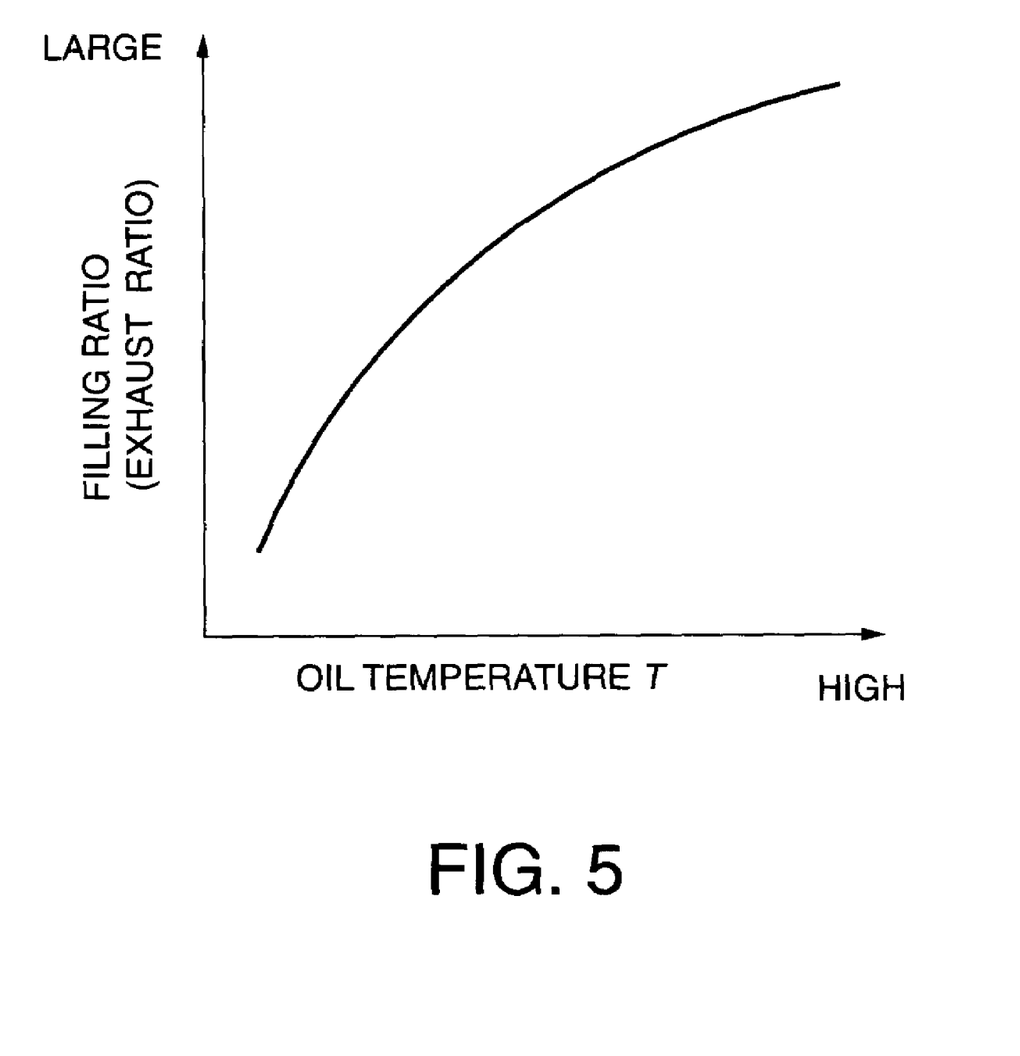
FIG. 5 is a diagram illustrating the characteristic of a filling ratio and exhaust ratio map stored by the controller.

Referring to FIG. 5, both the filling ratio and the exhaust ratio increase as the oil temperature T rises. Maps of the filling ratio and exhaust ratio which are based on this characteristic are stored in advance in the memory (ROM) of the controller 40, and the controller 40 determines the filling ratio and exhaust ratio by referring to these maps every time the voidage $S_D$ ($S_R$) is calculated.

The voidage calculation routine shown in FIG. 3 is used to perform this calculation. This routine is applicable to both forward running and reverse running. The values enclosed in parentheses in each step indicate processing during reverse running. Here, the routine will be described using forward running as an example.

First, in a step S201, the controller 40 determines whether or not the shift lever 43A has selected the D-range.

If the shift lever 43A has selected the D-range, the controller 40 calculates the voidage $S_D$ of the oil passage leading to the forward clutch 12 in a step S202 according to the equation (3A).

If the shift lever 43A has not selected the D-range, the controller 40 calculates the voidage $S_D$ of the oil passage leading to the forward clutch 12 in a step S203 according to the equation (4A).

If selection of the D-range by the shift lever 43A continues, the processing of the step S202 is executed every time the routine is executed, and the voidage $S_D$ decreases. If, on the other hand, selection of the non-D-range by the shift lever 43A continues, the processing of the step S203 is executed every time the routine is executed, and the voidage $S_D$ increases.

Similarly, if selection of the R-range by the shift lever 43A continues, the processing of the step S202 is executed every time the routine is executed, and the voidage $S_R$ decreases. If, on the other hand, selection of the non-R-range by the shift lever 43A continues, the processing of the step S203 is executed every time the routine is executed, and the voidage $S_R$ increases.

As described above, however, the voidages $S_D$ and $S_R$ vary from zero percent to a hundred percent, and hence voidages $S_D$ ($S_R$) which fall below zero percent and voidages $S_D$ ($S_R$) which exceed a hundred percent as a result of the calculation in the step S202 or S203 are restricted to zero percent and a hundred percent respectively.

The controller 40 terminates the routine following the processing of the step S202 or S203.

In this routine, the voidage $S_D$ calculated in the step S202 takes a value other than zero percent during the period from selection of the D-range by the shift lever 43A to the completion of engagement of the forward clutch 12. The voidage $S_D$ calculated in the step S203 takes a value other than a hundred percent during the period from selection by the shift lever 43A of another range following the D-range to the completion of release of the forward clutch 12.

The voidage $S_R$ is calculated similarly in the case of reverse running.

Hence the voidage $S_D$ ($S_R$) is updated every time the routine is executed.

Figure 7:
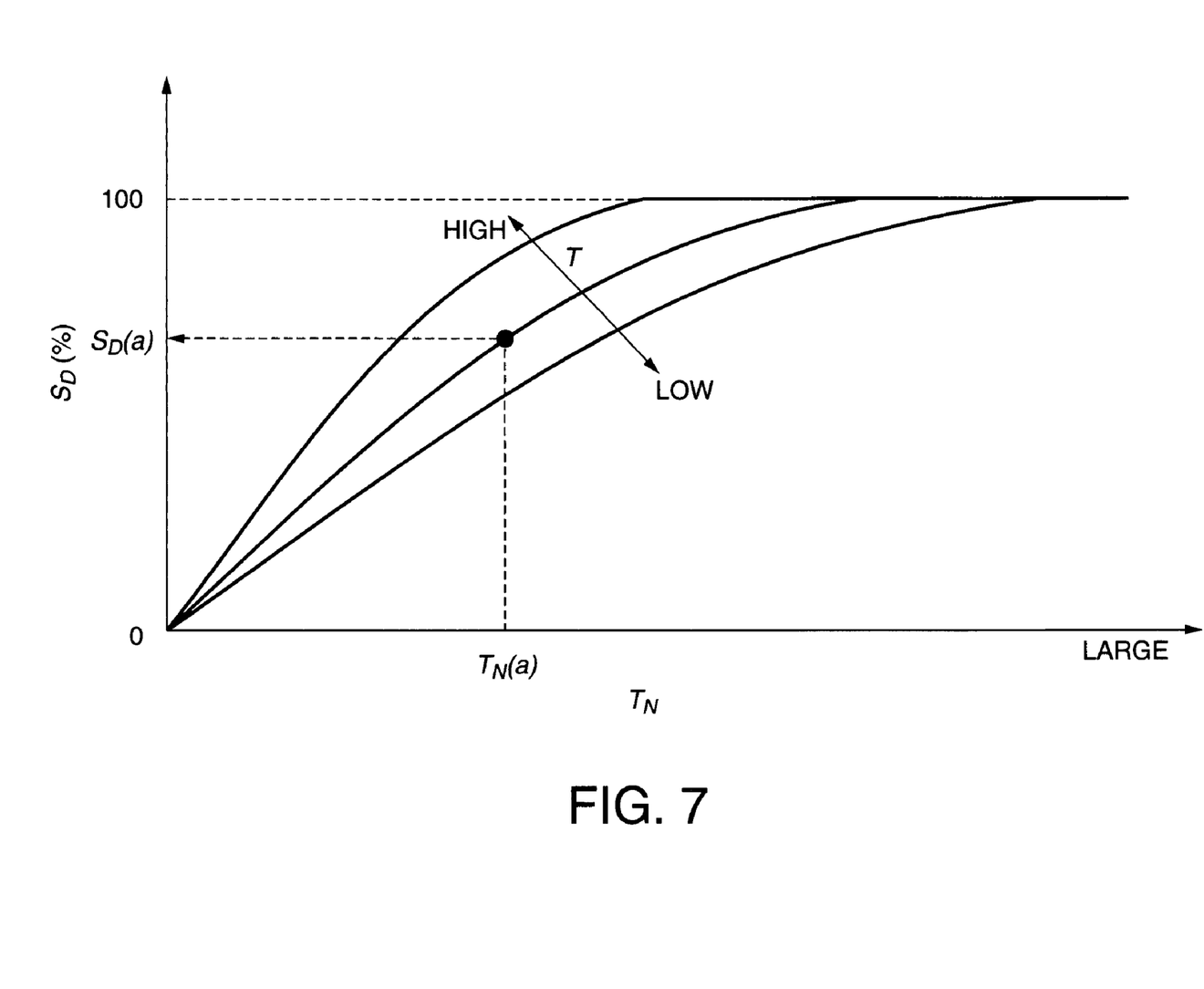
FIG. 7 is a diagram illustrating the effect of oil temperature on variation in the voidage of a piston cylinder.

FIG. 7 shows the voidage $S_D$ of the clutch piston chamber prior to engagement of the forward clutch 12. By executing the routine in FIG. 3 repeatedly, the voidage $S_D$ which results during a continuous time period $T_N$ of the non-D-range takes a larger value as the oil temperature T increases.

Next, referring to FIG. 4, a calculation routine for a precharge period $Tp_D$ ($Tp_R$) will be described.

Figure 6:
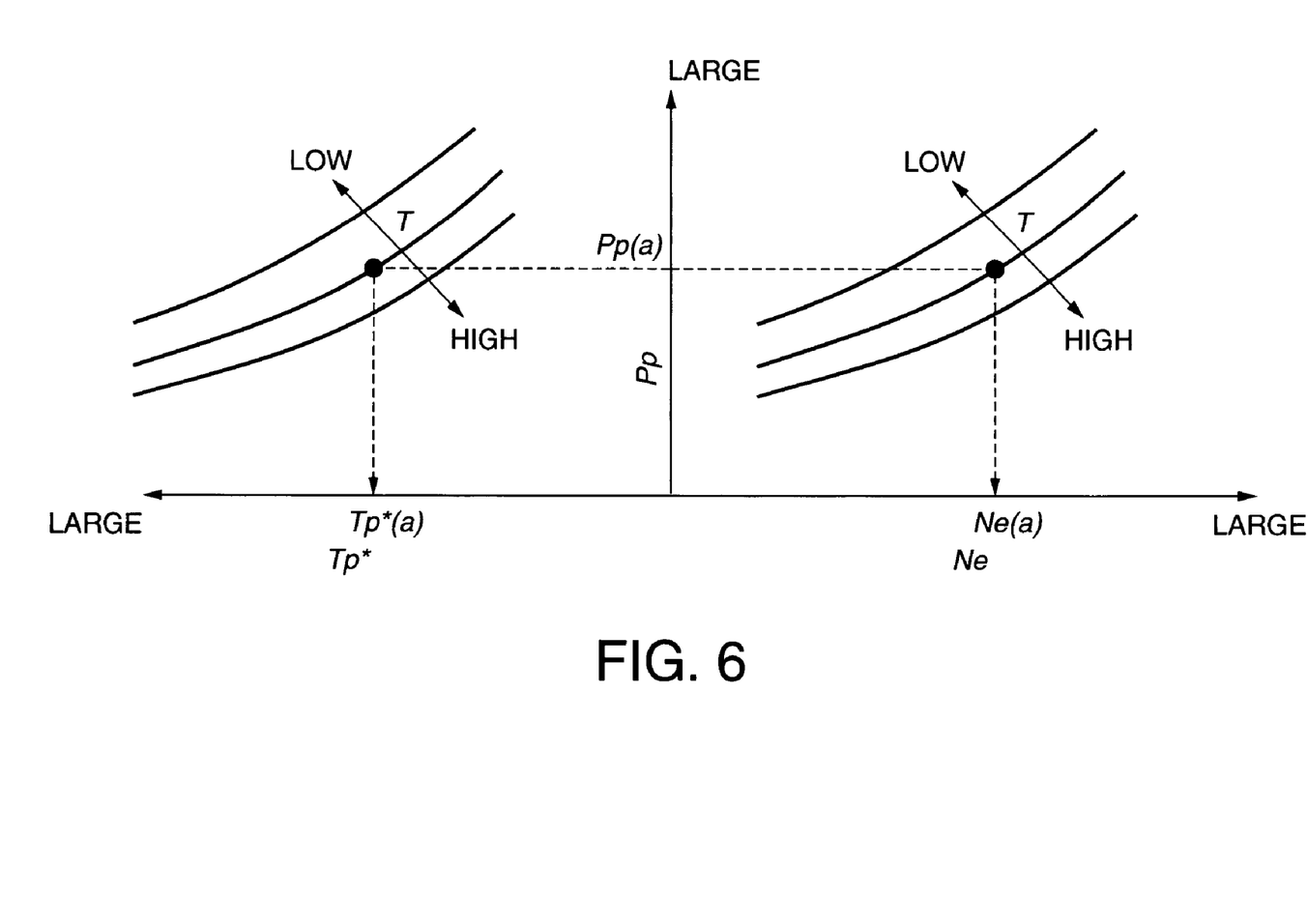
FIG. 6 is a diagram illustrating the characteristic of a precharge pressure and tentative precharge period map stored by the controller.

First, in a step S301, the controller 40 calculates a precharge pressure $Pp_D$ ($Pp_R$) which can be applied by the clutch pressure regulating unit 35 on the basis of the oil temperature T of the forward/reverse change-over mechanism 10 and the engine rotation speed Ne by referring to a map having the content shown in FIG. 6 which is stored in advance in the memory (ROM). In this map, the precharge pressure $Pp_D$ ($Pp_R$) increases as the engine rotation speed Ne increases. The precharge pressure $Pp_D$ ($Pp_R$) decreases as the oil temperature T rises.

In a next step S302, the controller 40 refers to the same map to calculate a tentative precharge period $Tp_D^*$ ($Tp_R^*$) from the precharge pressure $Pp_D$ ($Pp_R$) and oil temperature T. According to the map, the tentative precharge period $Tp_D^*$ shortens as the precharge pressure $Pp_D$ ($Pp_R$) increases. The tentative precharge period $Tp_D^*$ also shortens as the oil temperature T rises.

In a next step S303, the controller 40 determines whether or not the selected range of the shift lever 43A has shifted to the D-range (R-range) from another range since the previous execution of the routine. If the selected range of the shift lever 43A has shifted to the D-range (R-range) from another range since the previous execution of the routine, the processing of a step S304 is performed.

In the step S304, the controller 40 sets the latest voidage $S_D$ ($S_R$) calculated in the routine of FIG. 3 to a precharge period correction voidage $S_D\phi$ ($S_R\phi$) In other words, the precharge period correction voidage $S_D\phi$ ($S_R\phi$) indicates the voidage $S_D$ ($S_R$ at the change-over point of the range to the D-range (R-range). After the processing in the step S304, the controller 40 performs the processing in a step S305.

If, in the step S303, the selected range of the shift lever 43A has not shifted to the D-range (R-range) from another range since the previous execution of the routine, the controller 40 skips the step S304 and performs the processing of the step S305. Accordingly, the precharge period correction voidage $S_D\phi$ ($S_R\phi$) in this case is a value set during the previous or an earlier execution of the routine.

In the step S305, the precharge period $Tp_D$ ($Tp_R$) is calculated by multiplying the precharge period correction voidage $S_D\phi$ ($S_R\phi$) by the precharge period $Tp_D^*$ ($Tp_R^*$)

Figure 9:
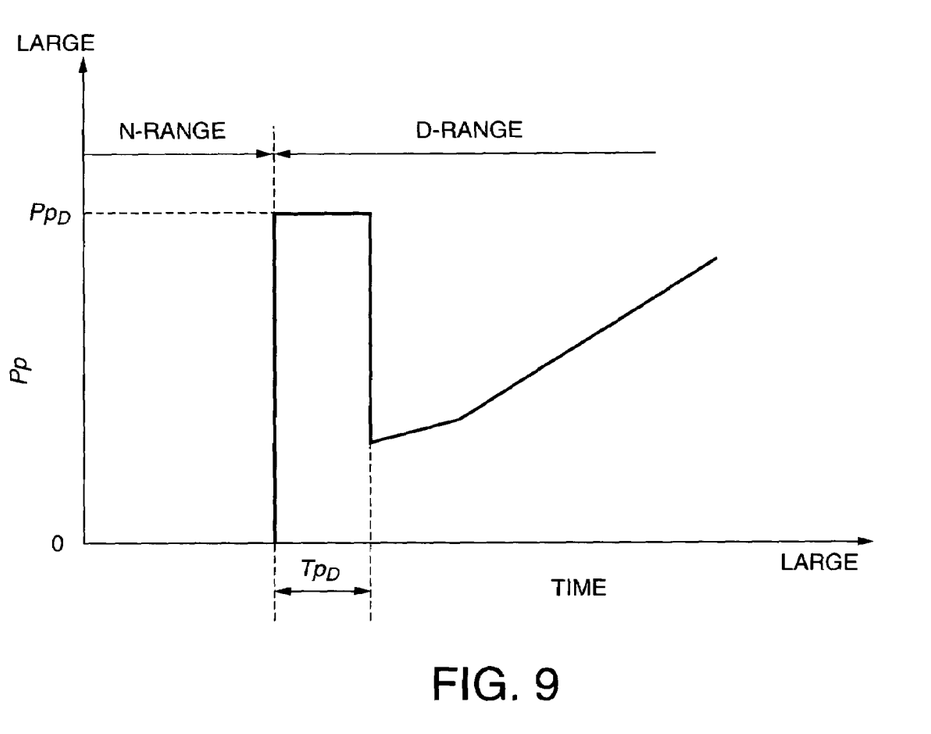
FIG. 9 is a timing chart illustrating the variation in a precharge pressure instruction signal output by the controller.

The controller 40 uses the precharge pressure $Pp_D$ ($Pp_R$) and precharge period $Tp_D$ ($Tp_R$) obtained by executing the timer counting routine, voidage calculation routine, and precharge period calculation routine described above to output a signal to the clutch pressure regulating unit 35 instructing that the precharge pressure $Pp_D$ be supplied to the clutch piston chamber of the forward clutch 12 over the precharge period $Tp_D$, as shown in FIG. 9. The figure relates to a shift from the N-range to the D-range, but the controller 40 also outputs a signal to the clutch pressure regulating unit 35 instructing that the precharge pressure $Pp_R$ be supplied to the clutch piston chamber of the reverse clutch 13 over the precharge period $Tp_R$ when a shift is performed from the N-range to the R-range. By outputting such an instruction signal to the clutch pressure regulating unit 35, the pressure inside the clutch piston chamber rises swiftly and smoothly.

The processing of the step S305 indicates that the precharge period $Tp_D$ ($Tp_R$) takes a greater value as the voidage $S_D$ ($S_R$) at the change-over point of the range to the D-range (R-range) increases. For example, if the driver shifts the shift lever 43A from the D-range to the N-range and then immediately shifts back to the D-range, the value of the non-D-range timer is small, and therefore the value of the voidage $S_D$ at the change-over point to the D-range is small.

Accordingly, the precharge period correction voidage $S_D\phi$ decreases and the precharge period $Tp_D$ shortens. The precharge period $Tp_R$ also shortens if the driver shifts the shift lever 43A from the R-range to the N-range and then immediately shifts back to the R-range.

By varying the precharge period $Tp_D$ ($Tp_R$) in accordance with the value of the non-D-range timer (non-R-range timer) in this manner, excessive pressure in the clutch piston chamber of the forward clutch 12 (reverse clutch 13) can be prevented.

Further, as described above, the tentative precharge period $Tp_D^*$ (Tp $R_R^*$) shortens as the oil temperature T rises, and the precharge period $Tp_D$ ($Tp_R$) shortens accordingly. The reason therefor is as follows.

Figure 8:
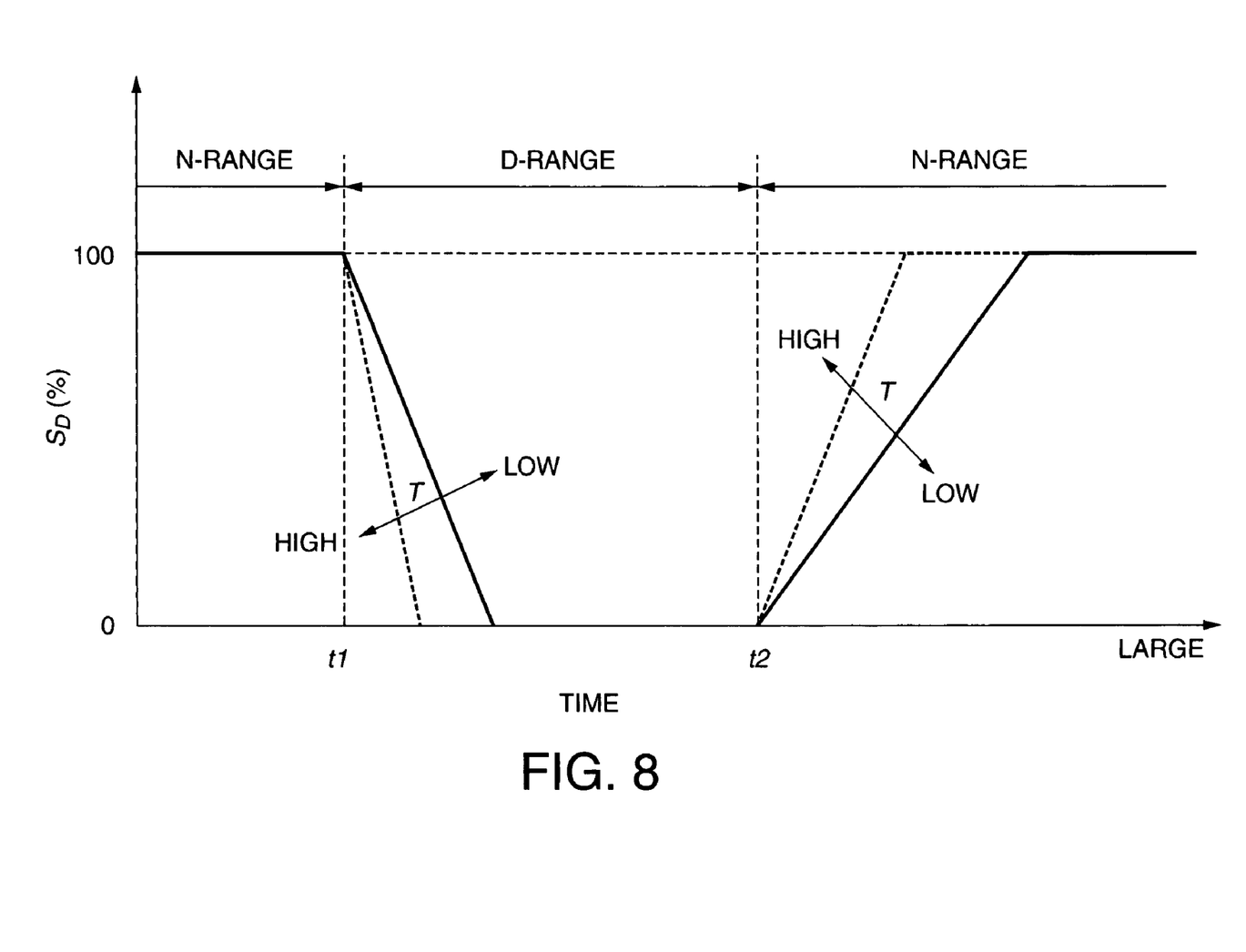
FIG. 8 is a timing chart illustrating variation in the voidage of the piston cylinder of a forward clutch when a shift operation between a D-range and an N-range is performed.

Referring to FIG. 8, at a time t1 at which the voidage $S_D$ of the clutch piston chamber of the forward clutch 12 is a hundred percent, the driver shifts the shift lever 43A from the N-range to the D-range. As a result, precharging is performed and the voidage $S_D$ of the clutch piston chamber of the forward clutch 12 decreases to zero percent at a speed corresponding to the oil temperature T If the driver shifts the shift lever 43A back to the N-range from the D-range at a time 2, the voidage $S_D$ of the clutch piston chamber of the forward clutch 12 rises to a hundred percent at a speed corresponding to the oil temperature T.

When the oil temperature T is low, hydraulic operation responsiveness is slow, and thus during a change-over from the N-range to the D-range, the speed at which the voidage $S_D$ decreases is slower than when the oil temperature T is high. The speed at which the voidage $S_D$ increases during a change-over from the D-range to the N-range is also slower than when the oil temperature T is high.

Hence if the precharge period is set regardless of the temperature T, irregularities occur in the state of precharging depending on the temperature T In order to compensate for such irregularities, the characteristic of the tentative precharge period $Tp_D^*$ ($Tp_R^*$) is set such that the precharge period $Tp_D$ ($Tp_R$) lengthens as the temperature T decreases. As a result, the precharge period $Tp_D$ ($Tp_R$) lengthens as the oil temperature T decreases even when the value of the non-D-range timer (non-R-range timer) is the same. By means of such setting, the effect of the oil temperature T on the hydraulic operation response is eliminated.

As described above, this invention sets the precharge period $Tp_D$ ($Tp_R$) during a shift back to the D-range or the R-range to be shorter as the value of the non-D-range timer or non-R-range timer decreases. As a result, appropriate precharging is performed in accordance with the residual hydraulic fluid in the clutch piston chamber. Even when the shift lever is shifted repeatedly and frequently from the D-range to the N-range or from the N-range to the D-range, precharging does not become excessive, and thus engagement shock in the hydraulic clutch due to excessive precharging can be prevented.

The contents of Tokugan 2002-248702, with a filing date of Aug. 28, 2002 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in this embodiment, a belt CVT is used as the transmission, but similar favorable effects are obtained when this invention is applied to an automatic transmission comprising a planetary gear set, for example.

In this embodiment, the engine rotation speed Ne and oil temperature T are respectively detected by sensors, and the timers are realized as functions of the controller 40. However, this invention is not dependent on these methods of obtaining parameters, and may be applied to any hydraulic clutch control device which executes the claimed control using the claimed parameters.

The embodiments of this invention in which an exclusive property or privilege is claimed are defined as follows:

What is claimed is:

1. A control device for a hydraulic clutch which is provided in a power train of a vehicle to transmit a drive torque, comprising:
    an oil pressure supply unit which supplies oil pressure to engage the clutch;
    a sensor which detects a temperature of the hydraulic fluid supplied to the clutch; and
    a programmable controller programmed to:
        count an elapsed time following a release of the clutch; and
        cause the oil pressure supply unit, when the clutch is engaged from a state of release, to precharge the interior of the clutch in accordance with the counted time to fill the interior of the clutch with hydraulic fluid prior to engaging the clutch;
        determine a precharge pressure based on the temperature of the hydraulic fluid such that the precharge pressure becomes higher as the temperature of the hydraulic fluid decreases;
        determine a tentative precharge period based on the precharge pressure and the temperature of the hydraulic fluid;
        calculate a voidage in the interior of the clutch based on the elapsed time and the temperature of the hydraulic fluid;
        determine a precharge period based on the product of the tentative precharge period and the voidage; and
        cause the oil pressure supply unit to precharge the interior of the clutch with the precharge pressure for the precharge period.

2. The control device as defined in claim 1,
    wherein the power train comprises a transmission comprising a forward range, a reverse range, and a neutral range,
    wherein the hydraulic clutch comprises a forward clutch which is engaged in the forward range and released in ranges other than the forward range, and
    wherein the controller is further programmed to:
        count a continuous time period of selection of a range other than the forward range, and
        precharge the interior of the forward clutch in accordance with the counted time.

3. The control device as defined in claim 2, further comprising:
    a shift lever which selects the forward range, the reverse range, and the neutral range; and
    an inhibitor switch which detects a selected range of the shift lever,
    wherein the controller is further programmed to cause the oil pressure supply unit to engage the forward clutch when the selected range is shifted to the forward range from another range.

4. The control device as defined in claim 1,
    wherein the power train comprises a transmission provided with a forward range, a reverse range, and a neutral range,
    wherein the hydraulic clutch comprises a reverse clutch which is engaged in the reverse range and released in ranges other than the reverse range, and
    wherein the controller is further programmed to:
        count a continuous time period of selection of a range other than the reverse range, and
        precharge the interior of the reverse clutch in accordance with the counted time.

5. The control device as defined in claim 4, further comprising:
    a shift lever which selects the forward range, the reverse range, and the neutral range; and
    an inhibitor switch which detects a selected range of the shift lever,
    wherein the controller is further programmed to cause the oil pressure supply unit to engage the reverse clutch when the selected range is shifted to the reverse range from another range.

6. The control device as defined in claim 1, wherein the controller is further programmed to cause the oil pressure supply unit to precharge the interior of the clutch for a longer period as the elapsed time decreases.

7. The control device as defined in claim 1, wherein the controller is further programmed to cause the oil pressure supply unit to precharge the interior of the clutch for a longer period as the temperature of the hydraulic fluid decreases.

8. The control device as defined in claim 1,
    wherein the power train comprises an internal combustion engine which generates driving torque,
    wherein the sensor detects a rotation speed of the engine, and
    wherein the controller is further programmed to cause the oil pressure supply unit to precharge the interior of the clutch with a higher precharge pressure as the rotation speed of the engine increases.

9. A control device for a hydraulic clutch which is provided in a power train of a vehicle to transmit a drive torque, comprising:
    means for supplying oil pressure to engage the clutch;
    means for detecting a temperature of the hydraulic fluid supplied to the clutch;
    means for counting an elapsed time following a release of the clutch;
    means for causing the oil pressure supplying means, when the clutch is engaged from a state of release, to precharge the interior of the clutch in accordance with the counted time to fill the interior of the clutch with hydraulic fluid prior to engaging the clutch;
    means for determining a precharge pressure based on the temperature of the hydraulic fluid such that the precharge pressure becomes higher as the temperature of the hydraulic fluid decreases;
    means for determining a tentative precharge period based on the precharge pressure and the temperature of the hydraulic fluid;
    means for calculating a voidage in the interior of the clutch based on the elapsed time and the temperature of the hydraulic fluid;
    means for determining a precharge period based on the product of the tentative precharge period and the voidage; and
    means for causing the oil pressure supply unit to precharge the interior of the clutch with the precharge pressure for the precharge period.

10. A control method of a hydraulic clutch which is provided in a power train of a vehicle to transmit a drive torque and is engaged by oil pressure, the method comprising:
   detecting a temperature of the hydraulic fluid supplied to the clutch;
   counting an elapsed time following a release of the clutch;
   precharging the interior of the clutch in accordance with the counted time to fill the interior of the clutch with hydraulic fluid prior to engaging the clutch;
   determining a precharge pressure based on the temperature of the hydraulic fluid such that the precharge pressure becomes higher as the temperature of the hydraulic fluid decreases;
   determining a tentative precharge period based on the precharge pressure and the temperature of the hydraulic fluid;
   calculating a voidage in the interior of the clutch based on the elapsed time and the temperature of the hydraulic fluid;
   determining a precharge period based on the product of the tentative precharge period and the voidage; and
   causing the oil pressure supply unit to precharge the interior of the clutch with the precharge pressure for the precharge period.

* * * * *